United States Patent
Seo et al.

(10) Patent No.: US 7,016,837 B2
(45) Date of Patent: Mar. 21, 2006

(54) VOICE RECOGNITION SYSTEM

(75) Inventors: Hiroshi Seo, Saitama (JP); Mitsuya Komamura, Saitama (JP); Soichi Toyama, Saitama (JP)

(73) Assignee: Pioneer Corporation, Tokyo (JP)

( * ) Notice: Subject to any disclaimer, the term of this patent is extended or adjusted under 35 U.S.C. 154(b) by 526 days.

(21) Appl. No.: 09/953,905

(22) Filed: Sep. 18, 2001

(65) Prior Publication Data

US 2002/0052741 A1    May 2, 2002

(30) Foreign Application Priority Data

Sep. 18, 2000  (JP)  .......................... P.2000-282349

(51) Int. Cl.
*G10L 15/20* (2006.01)
(52) U.S. Cl. ...................... 704/233; 704/255; 704/244; 704/256
(58) Field of Classification Search ............... 704/244, 704/233, 255, 256, 231, 222
See application file for complete search history.

(56) References Cited

U.S. PATENT DOCUMENTS 5,956,679 A * 9/1999 Komori et al. ............. 704/256
6,026,359 A * 2/2000 Yamaguchi et al. ...... 704/256.4

OTHER PUBLICATIONS

Hiroki Yamamoto et al., "Fast Speech Recognition Algorithm Under Noisy Environment Using Modified CMS-PMC and Improved IDMM+SQ," 1997 IEEE, International Conference on Acoustics, Speech and Signal Processing, vol. 2, Apr. 21, 1997, pp. 847-850.*

(Continued)

*Primary Examiner*—W. R. Young
*Assistant Examiner*—Huyen X. Vo
(74) *Attorney, Agent, or Firm*—Morgan, Lewis & Bockius LLP

(57) ABSTRACT

An initial combination HMM 16 is generated from a voice HMM 10 having multiplicative distortions and an initial noise HMM of additive noise, and at the same time, a Jacobian matrix J is calculated by a Jacobian matrix calculating section 19. Noise variation Namh (cep), in which an estimated value Ha^(cep) of the multiplicative distortions that are obtained from voice that is actually uttered, additive noise Na(cep) that is obtained in a non-utterance period, and additive noise Nm(cep) of the initial noise HMM 17 are combined, is multiplied by a Jacobian matrix, wherein the result of the multiplication and initial combination HMM 16 are combined, and an adaptive HMM 26 is generated. Thereby, an adaptive HMM 26 that is matched to the observation value series RNah(cep) generated from actual utterance voice can be generated in advance. When performing voice recognition by collating the observation value series RNah(cep) with adaptive HMM 26, influences due to the multiplicative distortions and additive distortions are counterbalanced, wherein an effect that is equivalent to a case where voice recognition is carried out with clean voice can be obtained, and a robust voice recognition system can be achieved.

8 Claims, 4 Drawing Sheets

OTHER PUBLICATIONS

Yoshikazu Yamaguchi et al., "Fast Adaptation of Acoustic Models to Environmental Noise Using Jacobian Adaptation Algorithm," ESCA, Eurospeech97, vol. 4, Sep. 22, 1997, pp. 2051-2054.*

M. Shozakai et al., "A Non-Iterative Model-Adaptive E-CMN/PMC Approach for Speech Recognition in Car Environments." Eurospeech 1997, Sep. 22, 1977, pp. 287-290.*

M.J.F. Gales et al., "Robust Speech Recognition in Additive and Convolutional Noise Using Parallel Model Combination," Computer Speech and Language, vol. 9, No. 4, Oct. 1, 1995, pp. 289-307.*

Jenq-Neng Hwang and Chien-Jen Wang, "Joint Model and Feature Space Optimization for Robust Speech Recognition," 1997 IEEE International Conference on Acoustics, Speech and Signal Processing, vol. 2, Apr. 21, 1997, pp. 855-858.*

* cited by examiner

VOICE RECOGNITION SYSTEM

BACKGROUND OF THE INVENTION

1. Field of the Invention

The present invention relates to a voice recognition system that is robust with respect to noise and distortions in a transmission system, etc.

2. Description of the Related Art

In the conventional arts, in an electronic device such as, for example, a navigation apparatus, etc., which is incorporated in an automobile, a voice recognition system that enables man-to-machine communications has been noted. As shown in FIG. 3, a voice recognition system has been known that is constructed on the basis of an information processing algorithm.

The voice recognition system generates in advance an acoustic model (voice HMM) consisting of words or subwords (phoneme, syllable, etc.,) by using the Hidden Markov Model (HMM), generates an observation value series Ra (cep) that is a time series of cepstrum with respect to utterance voice Ra when a voice Ra to be recognized is uttered, collates the observation value series Ra(cep) with the voice HMM, select a voice HMM that gives the highest likelihood, and outputs it as a result of recognition.

In further detail, the voice recognition system is provided with a voice HMM generating portion 5 that generates the above-described voice HMM in compliance with the HMM method, and the voice HMM generating portion 5 comprises a voice database 1, frame-by-frame fragmenting section 2, cepstrum operating section 3, and a training section 4.

The frame-by-frame fragmenting section 2 divides a great amount of voice data Rm of a testee, which has been experimentally collected and stored in the voice database 1, into frames each consisting of 10 through 20 msec or so, and the cepstrum operating section 3 operates respective frame-by-frame data in terms of cepstrum, whereby a time series Rm(cep) of the cepstrum is obtained.

Further, the training section 4 processes to train the time series Rm(cep) of the cepstrum as a feature of the voice (feature vector), and reflects it to parameters of the acoustic model (voice HMM), whereby the voice HMM 6 consisting of words or subwords is generated in advance.

When a utterance is actually carried out, data Ra of the utterance voice are divided into frames by a frame-by-frame fragmenting section 7 as in the frame-by-frame fragmenting section 2, and respective frame-by-frame utterance voice data are operated one after another by the cepstrum operating section 8, where by an observation value series Ra (cep) being a time series of the cepstrum is generated.

And, a collating section 9 collates the observation value series Ra (cep) with the voice HMM 6 in terms of words or subwords, and outputs the voice HMM which has the highest likelihood with respect to the observation value series Ra (cep), as the results of voice recognition.

However, in the voice recognition system shown in FIG. 3, voice data Rm that has been influenced by multiplicative distortions in a microphone and electric transmission system, etc., would be collected when collecting the voice data Rm to generate the voice HMM 6, wherein a problem resides in that it is difficult to satisfactorily generate accurate voice HMM 6

In addition, when an utterance voice Ra to be recognized is uttered, the additive noise such as indoor noise, background noise, etc., multiplicative distortions such as spatial transmission characteristics from the mouth to a microphone, and transmission characteristics in the microphone and electric transmission system, etc., adversely influence the observation value series Ra (cep), wherein such a problem resides in a lowering of the ratio of voice recognition.

In order to solve these and other problems, it is an essential issue to construct a voice recognition system that is scarcely influenced by the additive noise and multiplicative distortions, that is, a robust voice recognition system.

The present inventor has made an attempt to achieve a robust voice recognition system by applying an HMM combining method to the additive noise and the cepstrum means normalization method (CMN) to the multiplicative distortions in order to cope with the above-described subject.

FIG. 4 is a block diagram showing a configuration of the voice recognition system. The voice recognition system is provided with a voice HMM 10, an initial noise HMM 17, an initial combination HMM 16 and an adaptive HMM 26, wherein, when a voice to be recognized is uttered, observation value series RNa (cep) being the cepstrum time series, which has been obtained by the uttered voice, and adaptive HMM 26 are collated with each other by a collating section 29 in terms of words or subwords, and the adaptive HMM that has the highest likelihood with respect to the observation value series RNa (cep) is outputted as the results of voice recognition.

Further, since an amount of operation is increased if the HMM combination method is applied, a model adaptive method based on the Taylor expansion is employed in order to achieve high speed processing by decreasing the amount of operation. That is, by providing a Jacobian matrix calculating section 19 that calculates a primary derivative matrix of the Taylor expansion, which is called the "Jacobian Matrix J", an attempt is made to decrease the amount of operation.

The above-described voice HMM 10 is an acoustic model generated in advance by the HMM method using utterance voice Rm that is collected and does not include any additive noise. That is, the voice HMM 10 is generated in advance by processing based on an HMM method similar to that of the voice HMM generating section 5 shown in FIG. 3.

Also, by experimentally collecting utterance voice Rm in an anechoic room, a voice HMM 10 free from influences of the additive noise is generated. However, since influences due to multiplicative distortions in a microphone and electric transmission system, etc., cannot be removed, the voice HMM 10 becomes an acoustic model in which influences due to the multiplicative distortions remains.

Therefore, where it is assumed that the experimentally collected utterance voice Rm consists of clean voice Sm (voice not including any additive noise and multiplicative distortion) and multiplicative distortions Hm, if the utterance voice Rm is expressed in terms of linear spectral domain (lin), it is expressed by a product of the linear spectrum in which clean voice Sm is multiplied by multiplicative distortions Hm, that is, $Rm(lin)=Sm(lin)Hm(lin)$. Also, if it is expressed in terms of cepstrum domain (cep), the same is expressed by a sum of the cepstrum of clean voice Sm and multiplicative distortions Hm, that is, $Rm(cep)=Sm(cep)+Hm(cep)$.

Further, if the voice HMM 10 is expressed in terms of linear spectral domain (lin), it is expressed by $Rm(lin)=Sm(lin)Hm(lin)$, and if it is expressed in terms in the cepstrum domain (cep), it is expressed by $Rm(cep)=Sm(cep)+Hm(cep)$.

The above-described initial noise HMM 17 is an acoustic model in which sound (corresponding to the additive noise)

in a non-utterance period is collected as the initial noise data Nm, and is trained by using the initial noise data Nm, and the same is generated in advance by a process similar to that in the voice HMM generating section 5 shown in FIG. 3. Therefore, if the initial noise HMM 17 is expressed in terms of the linear spectral domain (lin), it becomes Nm(lin), and if it is expressed in terms of cepstrum domain (cep), it becomes Nm(cep).

The initial combination HMM 16 is generated by the following process.

Voice (acoustic model) in the cepstrum domain (cep) Rm(cep)=Sm(cep)+Hm(cep) is provided from the voice HMM 10 to the mean calculation section 11 and subtracter 12, and the mean calculation section 11 obtains an estimated value Hm^(cep) of the multiplicative distortions by averaging the feature vector in the voice database for training the acoustic model and averaging the mean vectors of the voice HMM by using the CMN method, and provides it to the subtracter 12. Thereby, an operation of Rm(cep)−Hm^(cep) is carried out in the subtracter 12, and the subtracter 12 outputs the voice Sm'(cep) in which the estimated value Hm^(cep) of the multiplicative distortions is removed.

Herein, by making an approximation in which the estimated value Hm(cep) is almost equal to the multiplicative distortions Hm(cep), it is assumed that voice Sm'(cep) free from any multiplicative distortion has been obtained.

Next, an inverse cepstrum converting section 13 converts the voice Sm'(cep) in the cepstrum domain to voice Sm'(lin) in the linear spectral domain and provides the same to an adder 14, and simultaneously, an inverse cepstrum converting section 18 converts the initial noise Nm(cep) (acoustic model of the initial noise) in the cepstrum domain, which is outputted from the initial noise HMM 17 to an initial noise Nm(lin) in the linear spectral domain and provides the same to the adder 14, whereby the adder 14 generates additive noise added voice Rm'(lin)=Sm'(lin)+Nm(lin) by adding the voice Sm'(lin) to initial noise Nm(lin) in the linear spectral domain, and provides the same to a cepstrum converting section 15.

And, the cepstrum converting section 15 converts the additive noise added voice Rm'(lin) to the additive noise added voice Rm'(cep) in the cepstrum domain, and generates the initial combination HMM 16.

Accordingly, the initial combination HMM 16 is made of an acoustic model that is characterized by the additive noise added voice Rm'(cep). The acoustic model is expressed as described below:

$$Rm'(cep) = cep[cep^{-1}[Sm(cep) + Hm(cep) - Hm\wedge(cep)] + Nm(lin)] \quad (1)$$

$$= cep[Sm'(lin) + Nm(lin)]$$

$$\approx cep[Sm(lin) + Nm(lin)]$$

Also, in the above described expression, cep[ ] expresses cepstrum conversion that is carried out in the cepstrum converting section 15, and cep$^{-1}$[ ] expresses inverse cepstrum conversion that is carried out by the inverse cepstrum converting sections 13 and 18.

Next, a description is given of the functions of the Jacobian matrix calculating section 19. As described above, the Jacobian matrix calculating portion 19 is provided in order to reduce the amount of calculation. Where it is assumed that a variation ΔNm(cep)=Na(cep)−Nm(cep) between the additive noise Na(cep) in actual use environments and the initial Nm(cep) in the initial noise HMM 17 is slight, a variation in a combined model corresponding to the variation ΔNm(cep) of the noise spectrum is obtained by the Taylor expansion, wherein the initial combination model 16 is compensated according to the obtained variation. And, the acoustic model obtained by the compensation is made into an adaptive HMM 26.

Speaking in further detail, the linear spectrum Rm(lin) is as follows:

$$Rm(lin)=Sm(lin)+Nm(lin) \quad (2)$$

where Sm(lin) is the linear spectrum of clean voice Sm not including the multiplicative distortions and additive noise;

Rm(lin) is the linear spectrum of the voice Rm in which no multiplicative distortion is included, but the additive noise is included; and Nm(lin) is the linear spectrum of the additive noise Nm.

Also, if the voice Rm including the additive noise is expressed in terms in the cepstrum domain;

$$Rm(cep)=IDCT[\log(\exp(DCT[Sm(cep)])+\exp(DCT[Nm(cep)]))] \quad (3)$$

Herein, IDCT [ ] is discrete inverse cosine transform, DCT [ ] is discrete cosine transform, log ( ) is logarithm conversion, and exp ( ) is exponential conversion.

Suppose the clean voice Sm does not vary bu the additive noise varies from Mm to Na in the actual utterance environment, a variation in the initial combination model ΔRm(cep) which is the difference between Rmc(cep) that is the voice containing the Na and the Rm(cep) that is the voice containing Nm in the cepstrum domain can be approximated by the first derivative term of the Taylor expansion of the expression (3) as shown in the followings expression (4).

$$\Delta Rm(cep) = \frac{\partial Rm(cep)}{\partial Nm(cep)} \Delta Nm(cep) = J(\Delta Nm(cep)) \quad (4)$$

Where ∂Rm(cep)/∂Nm(cep) is a Jacobian matrix and ΔNm(cep)=Na(cep)−Nm(cep) is the difference between the additive noise in the actual utterance environment and that in the initial noise in the cepstrum domain.

The expression (4) is also expressed as shown in the following expression (5).

$$Rmc(cep) = Rm(cep) + \frac{\partial Rm(cep)}{\partial Nm(cep)}(Na(cep) - Nm(cep)) \quad (5)$$

$$= IDCT[\log(\exp(DCT[Sm(cep)]) + \exp(DCT[Na(cep)]))]$$

An element of I-th row and j-th column of the Jacobian matrix, [J]$_{ij}$, is calculated by the following expression (6).

$$[J]_{ij} = \sum_{k=1}^{P} \frac{Rm'(cep)_k}{Nm(cep)_k} F_{ik}^{-1} F_{kj} \quad (6)$$

Where F$_{kj}$ is a k-th row j-th column element of a cosine transform matrix and F$_{ik}^{-1}$ is an I-th row k-th column element of an inverse cosine transform matrix.

Therefore, the Jacobian matrix calculating portion 19 can calculate the Jacobian matrix according to the expression (6) in advance by using the additive noise added voice Rm(lin) in the linear spectral domain that is received from the adder 14 and the initial noise Nm(lin) in the linear spectral domain that is received from the inverse cepstram converting section 18.

The initial combination HMM 16 is adaptively compensated on the basis of the additive noise that is produced in actual utterance environment. The variation in the initial combination model can be obtained by multiplying the variation ΔNm(cep) between the additive noises by the Jacobian Matrix J. Thus, it is possible to generates an adaptive model by adding the variation in the initial combination model to the initial combination model.

Next, a description is given of a process for generating an adaptive HMM 26.

As the utterance start switch (not illustrated) equipped with the voice recognition system is turned on by an user, a microphone (not illustrated) collects utterance voices and the frame-by-frame fragmenting section 20 fragments data Ra of the utterance voices, in units of an appointed duration of time. Further, the cepstrum operating section 21 processes the data Ra into utterance voice data Ra (cep) in the cepstrum domain (cep).

First, as the user turns on the above-described utterance start switch, a switch element 22 is changed over to the contact "a" side in a non-utterance period until utterance actually starts. Therefore, cepstrum Na(cep) of the background noise (additive noise) Na in an environment where the user attempts to utter is provided into a subtracter 23 through the switch element 22.

The subtracter 23 subtracts the cepstrum Nm(cep) of the initial noise Hm from the cepstrum Na(cep) of the background noise Na and provides the result Na(cep)–Nm(cep) of the subtraction to a multiplier 24, wherein the multiplier 24 multiplies the above-described result Na(cep)–Nm(cep) by the Jacobian matrix J, and provides the results of the multiplication J[Na(cep)–Nm(cep)] to an adder 25. The adder 25 adds the result J[Na(cep)–Nm(cep)] of the multiplication to the acoustic model Rm^(cep) of the initial combination HMM 16 in units of words or subwords, whereby an adaptive HMM 26 that has been adaptively compensated by the background noise Na in actual utterance environments is generated. That is, if the adaptive HMM 26 is expressed in terms in the cepstrum domain (cep), the following expression is established;

$$Radp(cep) = Rm'(cep) + J[Na(cep) - Nm(cep)] \quad (7)$$
$$\approx cep \, [Sm(lin) + Na(lin)]$$

Also, in the expression (7), cep[ ] expresses cepstrum conversion.

Thus, as the adaptive HMM 26 is generated, the switch element 22 is changed over to the contact "b" side, and utterance voice Ra to be recognized is inputted as the utterance voice Ra(cep) in the cepstrum domain. Herein, if it is assumed that the utterance voice Ra contains components Sa(lin), Ha(lin), and Na(lin) of the linear spectrum of clean voice Sa, multiplicative distortions Ha, and additive noise Na, the utterance voice Ra(cep) in the cepstrum domain is expressed by:

Ra(cep)=cep[Sa(lin)Ha(lin)+Na(lin)].

The mean calculation section 27 obtains an estimated value Ha^(cep) of the multiplicative distortions Ha(cep) by the CMN method, and the subtracter 28 subtracts the estimated value Ha^(cep) from the utterance voice Ra(cep), wherein the result Ra(cep)–Ha^(cep) of the subtraction is provided to the collating section 29 as observation value series RNa(cep).

And, the collating section 29 collates the observation value series RNa(cep) with the adaptive HMM 26 in terms of words or subwords, and outputs an adaptive HMM having the highest likelihood with respect to the observation value series RNa(cep) as the result of recognition. That is, the observation value series RNa(cep) is expressed by the expression below.

$$RNa(cep) = Ra(cep) - Ha^\wedge(cep) \quad (8)$$
$$= cep \left[ \frac{Sa(lin)Ha(lin)}{Ha^\wedge(lin)} + \frac{Na(lin)}{Ha^\wedge(lin)} \right]$$
$$\approx cep \left[ Sa(lin) + \frac{Na(lin)}{Ha^\wedge(lin)} \right]$$

The voice recognition is carried out by collating the feature vectors RNa(cep) of the observation value series, which are expressed by the above-described expression (8) with those of the adaptive HMM 26 Radp (cep) expressed by the above-described expression (7).

However, in the voice recognition system filed by the present inventor, which is shown in FIG. 4, voice recognition is carried out by collating the adaptive HMM 26 with the observation value series RNa(cep) of the utterance voice. However, there is a problem in that the adaptive HMM 26 has not been established yet as a sufficient model with respect to the observation value series RNa(cep).

That is, where the above-described expression (7) is compared with the above-described expression (8), the adaptive HMM 26 is featured by adding linear spectrum Na(lin) of the additive noise to the linear spectrum Sm(lin) of clean voice and converting the same into cepstrum domain. However, the observation value series RNa(cep) is featured by adding the ratio Na(lin)/Ha^(lin) of the linear spectrum Na(lin) of the additive noise to the linear spectrum Ha^(lin) of multiplicative distortions to the linear spectrum Sa(lin) of clean voice and converting the same into cepstrum domain.

Therefore, the adaptive HMM 26 is not such a model by which influences due to multiplicative distortions can be completely removed. Therefore, where the collating section 29 collates the adaptive HMM 26 with the observation value series RNa(cep), a case occurs where the adaptive HMM 26 does not model the observation value series RNa(cep) adequately. Finally, there is a problem in that the ratio of the voice recognition is not improved.

SUMMARY OF THE INVENTION

An object of the present invention is to overcome these and other problems and to provide a robust voice recognition system with respect to additive noise and multiplicative distortions.

In order to achieve the above-described object, a voice recognition system according to the invention comprises: a voice model that is generated from voices containing multiplicative distortions collected in advance; a noise model that is generated from additive noise collected in advance; a first section for estimating the multiplicative distortions contained in the voice model; a combined voice model that is generated on the basis of noise added voices, which are obtained by processing to combine the voice model, first estimated values of the multiplicative distortions estimated by the first estimating section, and additive noise of the noise model; a section for calculating a Jacobian matrix based on the additive noise of the noise model and the noise added voices; a second section for estimating multiplicative distortions contained in utterance voices; a first operating section for obtaining noise variation by processing to combine additive noise produced in a non-utterance period, additive noise of the noise model, and the second estimated values of the multiplicative distortions estimated by the second estimating section, and simultaneously multiplying the noise variation by the Jacobian matrix calculated by the calculating section; an adaptive model that is generated by processing to combine the results of multiplication obtained by the operating section and the combined voice model together; and a second operating section for generating an observation value series by processing to combine the utterance voice and the second estimated values of the multiplicative distortions estimated by the second estimating section; wherein voice recognition is carried out by collating the observation value series with the adaptive model.

According to the voice recognition system constructed as described above, noise added voice is generated by processing to combine a voice model having multiplicative distortions, the first estimated value of multiplicative distortions estimated by the first estimating section, and additive noise of the noise model, and a combined voice model is generated from the noise added voice.

Also, noise variation are generated by processing to combine additive noise that is produced in a non-utterance period, additive noise of the noise model, and the second estimated values of multiplicative noise estimated by the second estimating section.

Also, a Jacobian matrix is calculated from the additive noise of the noise model and noise added voice (that is, voice that is obtained by processing to combine the voice model having multiplicative distortions, the first estimated value of noise (multiplicative distortions) estimated by the first estimating section, and additive noise of the noise model).

The adaptive model is generated by processing to combine the results of multiplication of the noise variation by the Jacobian matrix and the combined voice model. That is, the adaptive model becomes a model that has a combined voice model and information of noise variation and Jacobian matrix.

When a voice is uttered, the second operating section generates an observation value series by processing to combine the second estimated value of multiplicative distortions, which is estimated by the second estimating section, with the utterance voice including multiplicative distortions and additive noise.

And, voice recognition is carried out by collating the observation value series with the adaptive model.

Herein, the adaptive model that is collated with the observation value series includes noise components that are matched to the noise components contained in the observation value series. Therefore, if the above-described observation value series is collated with the adaptive model, the influence due to the noise components are counterbalanced, and almost the same effect can be brought about as that obtained by collating the clean voice of the voice model with the uttered clean voice. Therefore, it is possible to achieve adequate voice recognition that is robust with respect to multiplicative distortions and additive noise.

Also, in order to achieve the above-described object, a voice recognition system according to the invention comprises; a voice model that is generated from voices containing multiplicative distortions collected in advance; a noise model that is generated from additive noise collected in advance; a first section for estimating the multiplicative distortions contained in the voice model; a second section for estimating the multiplicative distortions containing errors that vary depending on utterance voice, which are included in the voice model, on the basis of the results of recognition; a first operating section for combining the additive noise of the noise model with the multiplicative distortions estimated by the first estimating section; a combined voice model that is generated on the basis of noise-added voices which are obtained by processing to combine the combined results of the first operating section and the voice model together; a section for calculating a Jacobian matrix from the result of combinations made by the first operating section and the noise added voice; a third section for estimating multiplicative distortions containing errors that vary depending on utterance voice, which are included in the utterance voice; a second operating section for obtaining noise variation by processing to combine additive noise that are generated in a non-utterance period, the result of combinations made by the first operating section, the second estimated value of the multiplicative distortions containing errors that depending on utterance voice, which is estimated by the second estimating section, and the third estimated value of the multiplicative distortions containing errors of utterance voice, which is estimated by the third estimating section together and simultaneously multiplying the noise variation by the Jacobian matrix calculated by the calculating section; an adaptive model that is generated by processing to combine the result of multiplication, which is obtained by the second operating section, and the combined voice model; and a third operating section for generating an observation value series by processing to combine utterance voices, the second estimated value estimated by the second estimating section and the third estimated value of the multiplicative distortions containing errors that vary depending on utterance voice, which is estimated by the third estimating section; wherein voice recognition is carried out by collating the observation value series with the adaptive model.

According to the voice recognition system constructed as described above, the adaptive model is generated by processing to combine the results of multiplication of noise variation by a Jacobian matrix and a combined voice model. That is, the adaptive model is made into a model that includes information of the combined voice model, noise variation and Jacobian matrix.

And, as a voice is uttered, observation value series is generated by the third operating section processing to combine the second estimated values of multiplicative distortions estimated by the third estimated section and the third estimated values of the multiplicative distortions estimated by the third estimating section with the utterance voice including the multiplicative distortions and additive noise, and voice recognition is carried by collating the observation value series with the adaptive model.

Herein, the adaptive model that is collated with the observation value series includes noise components that are matched to the noise components included in the observation value series. Therefore, if the above-described observation value series is collated with the adaptive model, the influence due to the noise components is counterbalanced, and almost the same effect can be brought about as that which is obtained by collating clean voice of the voice model with uttered clean voice. Accordingly, adequate voice recognition that is robust with respect to the multiplicative distortions and additive distortions can be achieved.

DETAILED DESCRIPTION OF THE PRESENT INVENTION

Figure 1:
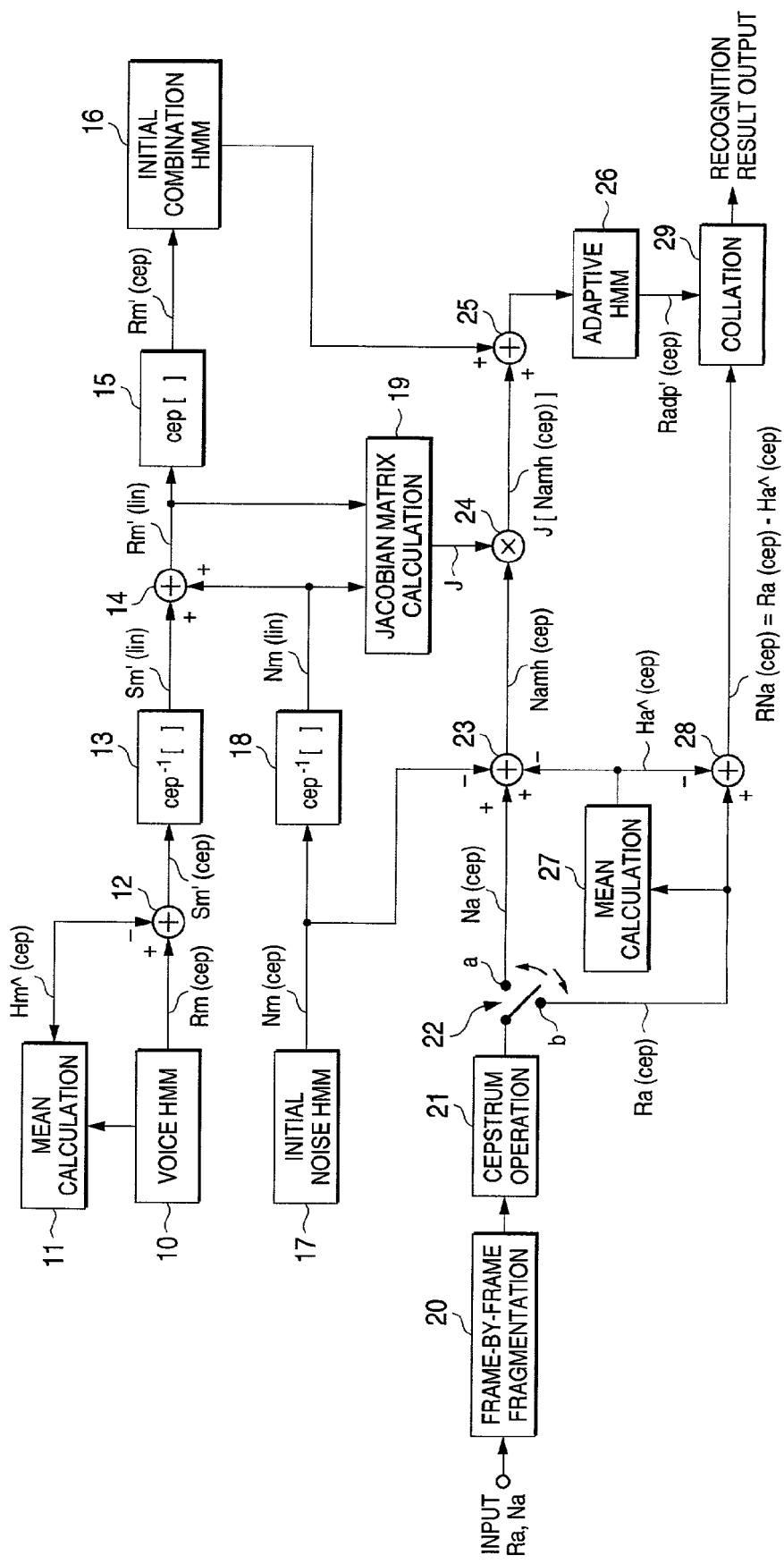
FIG. 1 is a block diagram showing the construction of a voice recognition system according to a first embodiment.
Figure 2:
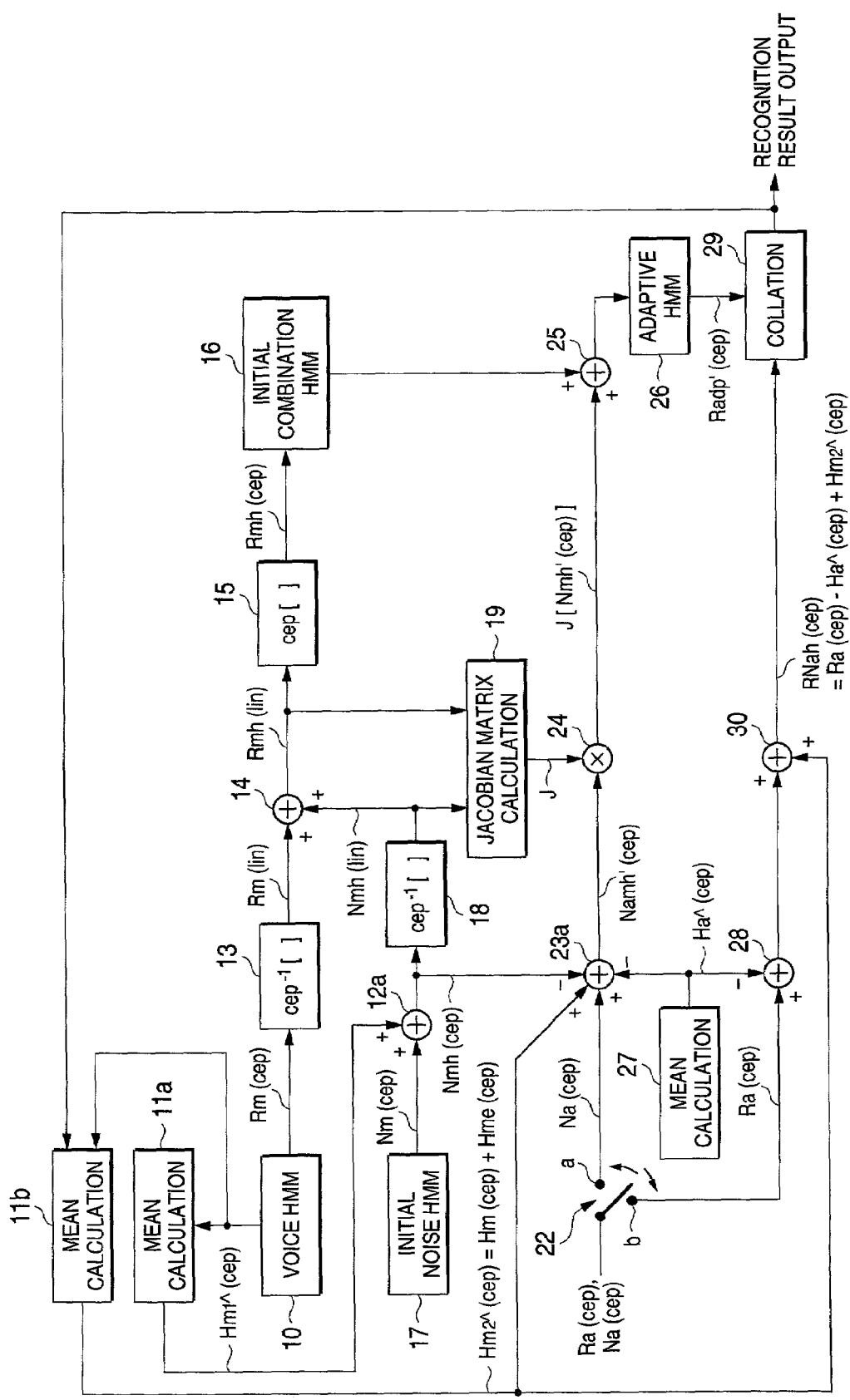
FIG. 2 is a block diagram showing the construction of a voice recognition system according to a second embodiment.
Figure 3:
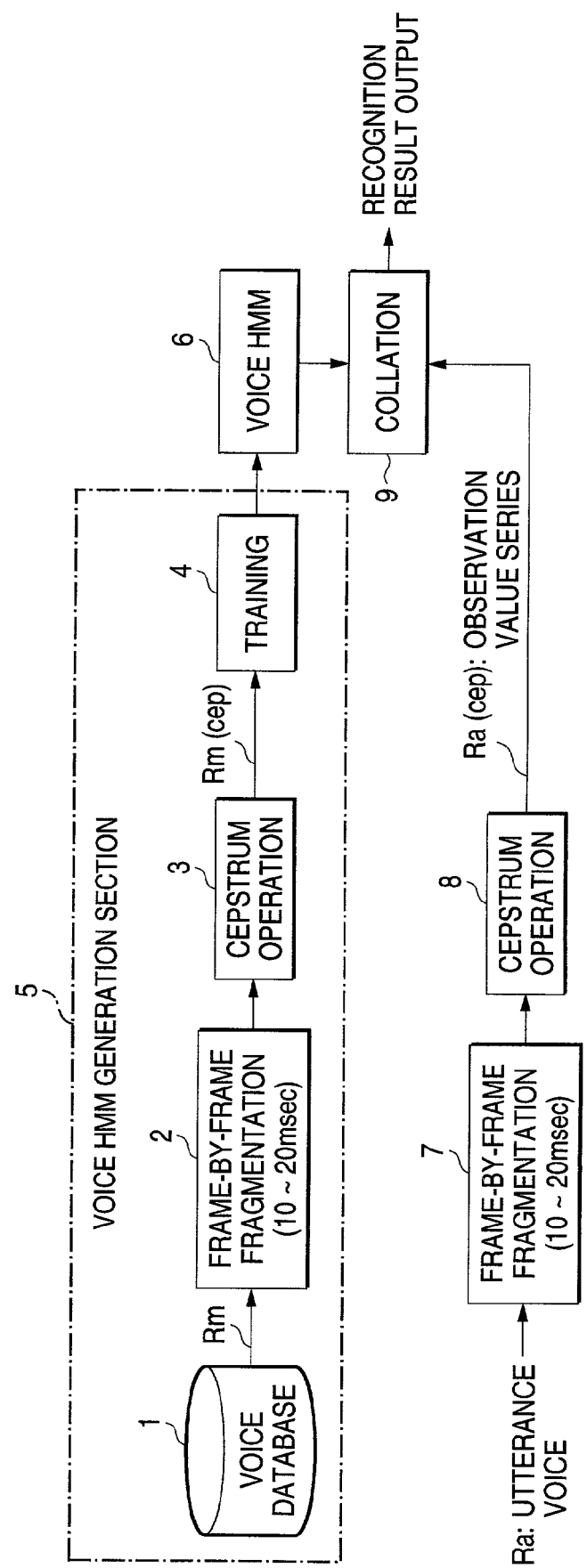
FIG. 3 is a block diagram showing the construction of the conventional art voice recognition system.

Hereinafter, a description is given of embodiments of the invention with reference to the accompanying drawings. Also, FIG. 1 is a block diagram showing a construction of a first embodiment of a voice recognition system according to the present invention, and FIG. 2 is a block diagram showing a construction of a second embodiment.

First, a description is given of the reference symbols prior to the description of the first and second embodiments.

It is assumed that voice in a time domain, which is used to generate a voice HMM 10 described later, is Rm, additive noise in a time domain, which is used to generate the initial noise HMM 17 is Nm, and the utterance voice in a time domain, in which voice is actually uttered, is Ra.

In addition, the above-described voice Rm is collected in advance and consists of a multiplicative distortion Hm and clean voice Sm not including noise. Also, the utterance voice Ra is consists of multiplicative distortions Ha, additive noise Na and the utter clean voice $a not including noise. In addition, the background noise such as indoor noise when no voice is uttered is referred to as Na.

Further, information in a linear spectral domain is shown with (lin), and information in a cepstrum domain is shown with (cep). For example, the marking of an acoustic model of the initial noise HMM 17 in a cepstrum domain is referred to as Nm(cep), and that in a linear spectral domain is referred to as Nm(lin).

First Embodiment

Figure 4:
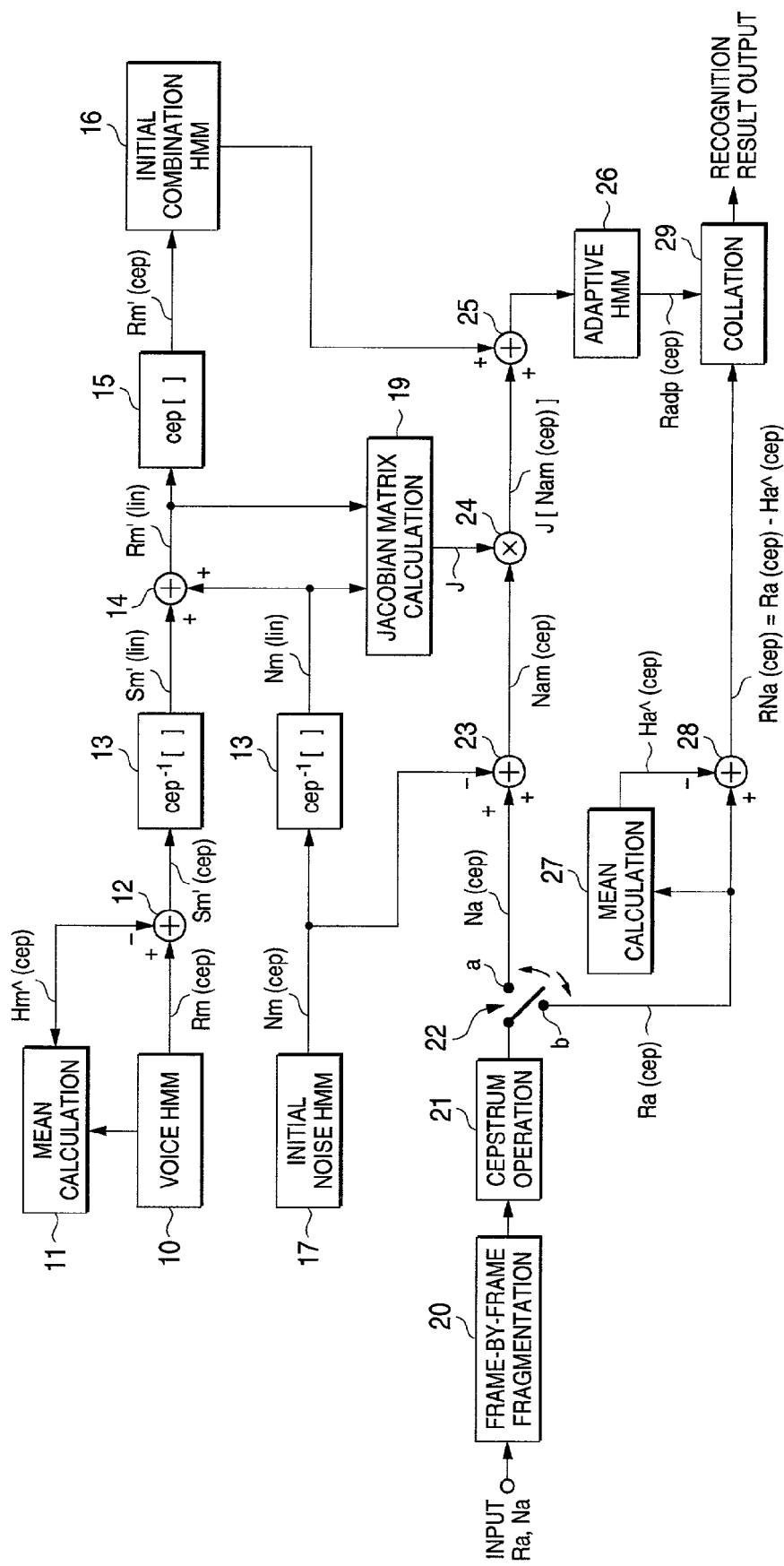
FIG. 4 is a block diagram showing the construction of a voice recognition system that the present inventor devised and studied when developing a voice recognition system of the present invention.

A description is given of the first embodiment with reference to FIG. 1. In addition, in FIG. 1, parts which are identical to or similar to those in FIG. 4 are given the same reference numbers.

The voice recognition system is provided with a voice HMM 10, an initial noise HMM 17, an initial combination HMM 16, a Jacobian matrix calculating section 19 that is used to remarkably reduce the amount of operation or calculation when generating and an adaptive HMM 26, wherein, as voice to be recognized is uttered, observation value series RNa (cep), which is a cepstrum time series obtained from the uttered voice, and adaptive HMM 26 are collated by a collating section 29 in units of words or subwords, the adaptive HMM having the highest likelihood with respect to the observation value series RNa(cep) is outputted as the result of the voice recognition.

The noise HMM 10 is an acoustic model that is generated in advance by the HMM method, using voice Rm that is experimentally collected and does not include additive noise. However, since influences due to multiplicative distortions in a microphone and electric transmission system, etc., are not removed although voice HMM free from influences due to additive noise is generated by experimentally collecting voice Rm in an anechoic room, the voice HMM 10 is such that influences due to the multiplicative distortions remain.

Therefore, if the voice HMM 10 is expressed in terms of linear spectral domain (lin), the same is expressed by a product Rm(lin)=Sm(lin)Hm(lin) of the linear spectra Sm(lin) and Hm(lin) of clean voice Sm and multiplicative distortions Hm, and if the voice HMM 10 is expressed in terms of cepstrum domain (cep), the same is expressed by a sum Rm(cep)=Sm(cep)+Hm(cep) of the cesptrums Sm(cep) and Hm(cep) of clean voice Sm and multiplicative distortions Hm.

The initial noise HMM 17 is an acoustic model that is trained in advance by collecting sound (equivalent to additive noise) in a non-utterance period as the initial noise data Nm and using the initial noise data Nm. Therefore, if the initial noise HMM 17 is expressed in terms of linear spectral domain (lin), the same becomes Nm(lin), and if it is expressed in terms of cepstrum domain (cep), the same becomes Nm(cep).

The initial combination HMM 16 is generated in advance by adding the acoustic models of the voice HMM 10 and initial noise HMM 17 in the linear spectral domain and converting the results of the addition to an acoustic model in the cepstrum domain.

That is, prior to the utterance of voice to be actually recognized, voice (acoustic model) Rm(cep)=Sm(cep)+Hm(cep) is provided from the voice HMM 10 to the mean calculation section 11 and subtracter 12. The mean calculation section 11 obtains an estimated value $Hm^{\wedge}(cep)$ of multiplicative distortions Hm(cep) by the CMN method, and further the subtracter 12 carries out an operation of $Rm(cep)-Hm^{\wedge}(cep)$, thereby generating voice Sm'(cep) from which the estimated value $Hm^{\wedge}(cep)$ of the multiplicative distortion is removed. In addition, the inverse cepstrum converting section 13 converts the voice Sm'(cep) in the cepstrum domain to voice Sm'(lin) in the linear spectral domain, and at the same time the inverse cepstrum converting section 18 converts the initial noise Nm(cep) (acoustic model of the initial noise) in the cepstrum domain from the initial noise HMM 17 to the initial noise Nm(lin) in the linear spectral domain, and the adder 14 adds the voice Sm'(lin) in the linear spectral domain to the initial noise Nm(lin), thereby generating additive noise added voice Rm'(lin)=Sm'(lin)+Nm(lin). And, the cepstrum converting section 15 converts the additive noise added voice Rm'(lin) to additive noise added voice Rm'(cep) in the cepstrum domain, wherein the initial combination HMM 16 is generated.

Therefore, the initial combination HMM 16 is made into an acoustic model that is featured by the additive noise added voice Rm'(cep) as expressed in the above-described expression (1).

The Jacobian matrix calculating section 19 inputs the initial noise Nm(lin) that is generated by the inverse cepstrum converting section 18 and additive noise added voice Rm'(lin) that is generated by the adder 14, and converts the initial noise Nm(lin) and additive noise added voice Rm'(lin) in these linear spectral domains to those in the cepstrum domain. By introducing these into the above-described expression (6), Jacobian matrix $J=\partial Rm'(cep)/\partial Nm(cep)$, which is the primary derivative matrix of the Taylor expansion, is generated in advance for each of the subword combination HMMs.

The adaptive HMM 26 is an acoustic model that is generated by adaptively compensating the initial combination HMM 16 in response to the background noise Na corresponding to the additive noise, which is collected by a microphone (not illustrated) before a user actually starts utterance by turning on the utterance start switch (not illustrated) equipped in the voice recognition system, wherein the adaptive HMM 26 is generated in advance before the start of actual utterance.

In addition, the voice recognition system is provided with a frame-by-frame fragmenting section 20, a cepstrum operating section 21, a switch element 22, an adder and subtracter 23, a multiplier 24, an adder 25, a mean calculation section 27, and a subtracter 28.

When the above-described microphone is made into a sound-collecting state by turning on the above-described utterance start switch, the frame-by-frame fragmenting section 20 receives input of the background noise Na (equivalent to the additive noise) and utterance voice Ra, which are outputted from the microphone and analog-digitally converted, and outputs after having divided them frame by frame, depending on an appointed interval.

The cepstrum operating section 21 converts frame-by-frame background noise Na and utterance voice Ra into cepstrum and generates and outputs the cepstrums Na(cep) and Ra(cep) of the background noise Na and utterance voice Ra.

The switch element 22 is changed over to the contact "a" side in a non-utterance period until utterance is actually commenced by turning on the above-described utterance start switch, whereby the cepstrum Na(cep) of the background noise is provided to the adder and subtracter 23 side. Also, the switch is changed over to the contact "b" side in a period in which the utterance is being actually carried out, whereby the cepstrum Ra(cep) of the utterance voice is provided to the mean calculation section 27 and adder 28 side.

The mean calculation section 27 operates the cepstrum Ra(cep) of several utterance voices by the CMN method in order to obtain the mean, and obtains the estimated value Ha^(cep) of the cepstrum of the multiplicative distortions Ha, which are included in the cepstrum Ra(cep).

Also, the mean calculation section 27 is provided with a memory section (not illustrated) such as a semiconductor memory that stores the estimated values Ha^(cep), and whenever the utterance start switch is operated, the memory section outputs the estimated value Ha^(cep) that has been obtained when a voice was uttered the last time, and updates the estimated value Ha^(cep) by using the mean of the voice is uttered this time and stores the newly estimated value Ha^(cep).

The adder and subtracter 23 subtracts the estimated value Ha^(cep) of the multiplicative distortions and initial noise Nm(cep) from the background noise Na(cep) by operations in the cepstrum domain, whereby the additive noise cepstrum variation Namh(cep) that is expressed by the following expression (9) are obtained, and are provided to the multiplier 24.

$$Namh(cep) = Na(cep) - Ha\hat{}(cep) - Nm(cep) \quad (9)$$

The multiplier 24 multiplies the additive noise cepstrum variation Namh(cep) by a Jacobian matrix J, and the result of multiplication J [Namh(cep)]=J[Na(cep)−Ha^(cep)−Nm (cep)] is provided to the adder 25.

The adder 25 adds the above-described result of multiplication J [Namh (cep)] to the acoustic model Rm'(cep) of the initial composition HMM 16 in terms of words or subwords, whereby an adaptive HMM 26 that has been adaptively compensated by the background noise Na in actual utterance environments is generated. That is, if the adaptive HMM 26 is expressed in terms in the cepstrum domain (cep), the following expression is established:

$$\begin{aligned} Radp'(cep) &= Rm'(cep) + J[Namh(cep)] \quad (10) \\ &= Rm'(cep) + J[Na(cep) - Ha^\wedge(cep) - Nm(cep)] \\ &= cep\left[Sm(lin) + \frac{Na(lin)}{Ha^\wedge(lin)}\right] \end{aligned}$$

Also, cep[ ] in the above expression (10) expresses the cepstrum conversion.

Next, a description is given of the operations of such a voice recognition system.

First, as described above, the voice HMM 10, initial noise HMM 17 and initial combination HMM 16 are prepared in advance prior to the start of actual voice recognition, and further a Jacobian matrix J is prepared by the Jacobian matrix calculating section 19.

Next, as a user turns on the utterance start switch, a microphone (not illustrated) enters a sound collecting status, and the switch element 22 is changed over to the contact "a" side in a non-utterance period before the start of actual utterance, wherein the background noise Na is inputted. Therefore, the cepstrum Na(cep) of the background noise Na is provided to the adder and subtracter 23 through the frame-by-frame fragmenting section 20, cepstrum operating section 21 and switch element 22. Further, the adder and subtracter 23 is given the estimated value Ha^(cep) of the multiplicative distortions, which has been obtained in the last utterance time, from the mean calculation section 27, and the initial noise Nm(cep) is provided from the initial noise HMM 17.

And, the adder and subtracter 23 obtains the additive noise cepstrum variation Namh(cep) that are expressed by the above-described expression (9), and the multiplier 24 multiplies the additive noise cepstrum variation Namh(cep) by a Jacobian matrix J. Further, the adder 25 adds the result of the multiplication J[Namh(cep)] to the initial combination HMM 16 in units of words or subwords, whereby an adaptive HMM 26 is generated.

Next, as the generation of the adaptive HMM 26 is finished, the switch element 22 is changed over to the contact "b" side. And, as an user actually utters, the frame-by-frame fragmenting section 20 and cepstrum operating section 21 converts the utterance voice Ra into the utterance voice Ra(cep) in the cepstrum domain, and provide the same to the mean calculation section 27 and subtracter 28 through the switch element 22.

Thereby, the mean calculation section 27 newly generates an estimated value Ha^(cep) in the cepstrum domain of the multiplicative distortions Ha, which are included in the utterance voice Ra(cep), by the CMN method, and stores the same. At the same time, the newly generated estimated value Ha^(cep) is provided to the adder and subtracter 28.

And, the adder and subtracter 28 generates an observation value series RNa(cep)=Ra(cep)−Ha^(cep), from which the multiplicative distortions are removed, by subtracting the estimated value Ha^(cep) from the utterance voice Ra(cep), and the collating section 29 collates the observation value series RNa(cep) and adaptive HMM 26 in units of words or subwords, wherein the adaptive HMM that obtains the highest likelihood is outputted as the result of voice recognition.

Herein, as shown in the above-described expression (8), the observation value series RNa(cep) is featured by adding the ratio Na(lin)/Ha^(lin) of the linear spectrum Na(lin) of the additive noise to the linear spectrum Ha^(lin) of the multiplicative distortions to the linear spectrum Sa(lin) of clean voice and converting the same into cepstrum. On the other hand, as shown in the above-described expression (10), the adaptive HMM 26 is featured by adding the ratio Na(lin)/Ha^(lin) of the linear spectrum Na(lin) of the additive noise to the linear spectrum Ha^(lin) of the multiplicative distortions to the linear spectrum Sm(lin) of clean voice and converting the same into cepstrum.

That is, since both of the noise spectra of the adaptive HMM 26 and the observation value series RNa(cep) are made into Na(lin)/Ha^(lin), the adaptive HMM 26 becomes an acoustic mode matched with respect to the observation value series RNa(cep).

Also, since both of the noise spectra are Na(lin)/Ha^(lin) when the collating section 29 collates the observation value series RNa(lin) with the adaptive HMM 26, the influences due to noise (additive noise and multiplicative distortions) of the adaptive HMM 26 and observation value series RNa (cep) are substantially counter balanced by each other, clean voice Sm(cep) can be collated with clean utterance voice Sa(cep), wherein the ratio of voice recognition can be further improved.

Thus, according to the voice recognition system of the present embodiment, the adaptive HMM 26 can be made into an acoustic model matched with respect to the observation value series RNa(cep) that are obtained when actual utterance occurs, and is constructed so as to cope with the additive noise and multiplicative distortions. Therefore, the voice recognition system is robust with respect to the additive noise and multiplicative distortions and it is possible to improve the ratio of voice recognition. Furthermore, since an adequate configuration to apply a Jacobian matrix has been achieved, the time required for voice recognition can be remarkably shortened.

Second Embodiment

Next, a description is given of a voice recognition system according to the second embodiment with reference to FIG. 2. Also, in FIG. 2, parts that are identical to or similar to those in FIG. 1 are given the same reference numbers.

In FIG. 2, the points that differ from the first embodiment are described below. The voice recognition system according to the second embodiment is provided with two mean calculation sections 11a and 11b, an adder 12a, an adder and subtracter 23a, and an adder 30.

In addition, the subtracter 12 shown in FIG. 1 is not provided. Therefore, voice Rm(cep) in the cepstrum domain of the voice HMM 10 is provided directly to an inverse cepstrum converting section 13.

The first mean calculation section 11a obtains the mean of a great amount of voice HMM by obtaining the total mean of the mean vector of the voice HMM 10, and obtains an estimated value Hml^(cep) of the multiplicative distortions.

By averaging the mean vector of the subword voice HMM, corresponding to the results of recognition, of the range of utterance voice (equivalent to several times of utterance in the past) that was used for Ha^ estimation (described later) in the last utterance, the second mean calculation section 11b generates a new estimation value Hm2^(cep)=Hm(cep)+Hme(cep) of multiplicative distortions, consisting the true multiplicative distortion Hm(cep) and error Hme(cep) of the multiplicative distortion that varies depending on the uttered voice.

The adder 12a adds the initial noise Nm(cep) from the initial noise HMM 17 to the estimated value Hml^(cep) from the first mean calculation section 11a, and provides the result (Nmh(cep)=Nm(cep)+Hml^(cep)) of the addition to the adder and subtracter 23a and inverse cepstrum converting section 18.

The adder and subtracter 23a is given the estimated value Hm2^(cep), which comes from the second mean calculation section 11b, in addition to the result Nmh(cep) of addition from the above-described adder and subtracter 23a. Further, the adder and subtracter 23a is also given the estimated value Ha^(cep), which comes from the mean calculation section 27, and background noise Na(cep) in a non-utterance period, whereby the adder and subtracter 23a generates additive noise cepstrum variation Namh'(cep), which is used to generate the adaptive HMM 26, as expressed by the following expression (11).

$$\begin{aligned} Namh'(cep) &= Na(cep) + Hm2^\wedge(cep) - Ha^\wedge(cep) - Nmh(cep) \\ &= Na(cep) + Hm2^\wedge(cep) - Ha^\wedge(cep) - Nm(cep) - \\ &\quad Hml^\wedge(cep) \end{aligned} \quad (11)$$

As illustrated, the initial combination HMM 16 of the present embodiment is generated in advance by the result Nmh(cep) of addition, which has been generated by the adder 12a, and voice Rm(cep) from which multiplicative distortions Hm of the voice HMM 10 are not removed. That is, the inverse cepstrum converting section 13 converts the voice Rm(cep), from which the multiplicative distortions Hm are not removed, into voice Rm(lin) in the linear spectral domain, and the inverse cepstrum converting section 18 converts the above-described result Nmh(cep) of addition into the result Nmh(lin) of addition in the linear spectral domain. And, the adder 14 adds Rm(lin) and Nmh (lin) to each other. The cepstrum converting section 15 converts the additive noise added voice Rmh(lin)=Rm(lin)+ Nmh(lin), which is generated by the adder 14, into the additive noise added voice Rmh(cep) in the cepstrum domain, whereby the initial combination HMM 16 is generated.

Therefore, the initial combination HMM 16 is expressed by the following expression (12).

$$\begin{aligned} Rmh(cep) &= Rm(cep) + Nm(cep) + Hml^\wedge(cep) \\ &= Sm(cep) + Hm(cep) + Nm(cep) + Hml^\wedge(cep) \\ &= cep\,[Rmh(lin)] \\ &= cep\,[Sm(lin)Hm(lin) + Nm(lin)Hml^\wedge(lin)] \end{aligned} \quad (12)$$

Also, cep [ ] in the expression (12) expresses cepstrum conversion.

In the mean calculation section 27 according to the present embodiment, if the cepstrum Ra(cep) of the utterance voice Ra is provided through the contact "b" of the switch element 22 during utterance, an error Hae(cep) of the multiplicative distortions, which varies depending on to the utterance voice, is included in the true multiplicative distortions Ha(cep) that are added to Ra(cep), the estimated value of the multiplicative distortions is expressed by Ha^(cep)=Ha(cep)+Hae(cep).

Therefore, the mean calculation section 27 shown in FIG. 2 is different from the mean calculation section 27 of the first embodiment shown in FIG. 1 in that the above Ha^(cep) is assumed to be equal to Ha(cep) while in this embodiment Ha^(cep) is assumed to be equal to Ha(cep)+Hqe(cep), wherein Hae is an error of the estimated value of the multiplicative distortions, which changes in compliance with the content of utterance. The content of the utterance is the same as the result of recognition if the result of the recognition is correct. When estimating Hm2^, the content of utterance used in estimating Ha^ is used, by using the result of recognition. Therefore, Hae≈Hme is established, and therefore errors in the multiplicative distortions that vary depending on the utterance voice can be assumed being equal in Ha^ and Hm2^.

The Jacobian matrix calculating section 19 according to the present invention receives noise Nmh(lin) generated by the inverse cepstrum converting section 18 and additive noise added voice Rmh(lin) generated by the adder 14, and introduces the same into the above-described expression (6), wherein the primary derivative J=∂Rm(cep)/∂Nm(cep) of the Taylor expansion is produced in advance as a Jacobian matrix J.

And, the multiplier 24 multiplies the Jacobian matrix J by the cepstrum variation Namh'(cep) of the additive noise from the adder and subtracter 23a, and provides the result J[Namh'(cep)] of the multiplication to the adder 25. Further, the adder 25 adds the result J[Namh'(cep)] of multiplication to the initial combination HMM 16, whereby the adaptive HMM 26 is generated.

Also, based on the above-described expression (11), the result J[Namh'(cep)] of multiplication is made into J[Na(cep)+Hm2^(cep)−Ha^(cep)−Nm(cep)−Hm1^(cep)], the adaptive HMM 26 becomes:

$$Radp'(cep) = Rmh(cep) + J[Na(cep) + Hm2^\wedge(cep) - Ha^\wedge(cep) - \quad (13)$$

$$Nm(cep) - Hm1^\wedge(cep)]$$

$$= cep\left[Sm(lin)Hm(lin) + \frac{Na(lin)Hm2^\wedge(lin)}{Ha^\wedge(lin)}\right]$$

The adder 30 adds the estimated value Hm2^(cep), which is from the second mean calculation section 11b, to Ra(cep)−Ha^(cep) provided by the adder and subtracter 28 which is a difference between the utterance voice Ra(cep) and the estimated value Ha^(cep), and generates an observation value series RNah(cep)=Ra(cep)−Ha^(cep)+Hm2^(cep) and provides the same to the collating section 29.

Therefore, as shown by the expression (14), the observation value series RNah(cep) becomes:

$$RNah(cep) = Ra(cep) - Ha^\wedge(cep) + Hm2^\wedge(cep) \quad (14)$$

$$= cep\left[\frac{Sa(lin)Ha(lin)Hm2^\wedge(lin)}{Ha^\wedge(lin)} + \frac{Na(lin)Hm2^\wedge(lin)}{Ha^\wedge(lin)}\right]$$

$$= cep\left[\frac{Sa(lin)Ha(lin)}{Ha(lin)Hme(cep)} + \frac{Na(lin)Hm2^\wedge(lin)}{Ha^\wedge(lin)}\right]$$

-continued $$= cep\left[Sa(lin)Hm(lin) + \frac{Na(lin)Hm2^\wedge(lin)}{Ha^\wedge(lin)}\right]$$

Next, a description is given of the actions of a voice recognition system constructed as described above.

First, as described above, prior to the start of actual voice recognition, a voice HMM 10, initial noise HMM 17 and initial combination HMM 16 are prepared in advance, and further a Jacobian matrix J is prepared by the Jacobian matrix calculating section 19.

As a user turns on the utterance start switch, a microphone (not illustrated) enters a sound collecting status, and the switch element 22 is changed over to the contact "a" side in a non-utterance period before utterance actually starts, wherein the background noise Na is inputted. Thereby, the cepstrum Na(cep) of the background noise Na is provided to the adder and subtracter 23a through the frame-by-frame fragmenting section 20, cepstrum operation section 21 and switch element 22. Further, an estimated value Ha^(cep) of multiplicative distortions, which has been obtained from the mean calculation section 27 in the last utterance time is provided to the adder and subtracter 23a. At the same time, noise Nmh(cep) from the adder 12a and the estimated value Hm2^(cep) from the second mean calculation section 11b are provided thereto. The Hm2^(cep) can be estimated by averaging the mean vector of the subword voice HMM, corresponding to the result of recognition, of an utterance voice range (equivalent to several utterance times in the past) which is used for estimation of Ha^ (described later) in the last utterance.

And, the adder and subtracter 23a obtains the cepstrum variation Namh'(cep) of the additive noise that is expressed by the above expression (11), and the multiplier 24 multiplies the cepstrum variation Namh'(cep) of the additive noise by the Jacobian matrix J. Further, the adder 25 generates an adaptive HMM 26 by adding the result J[Namh'(cep)] of multiplication to the initial combination HMM 16 to each other in units of words or subwords.

Next, as the generation of the adaptive HMM 26 is finished, the switch element 22 is changed over to the contact "b" side. And, as a user actually utters, the frame-by-frame fragmenting section 20 divides the utterance voice Ra into frame and cepstrum operating section 21 converts the utterance voice Ra into the utterance voice Ra (cep) in the cepstrum domain, wherein the same is provided to the mean calculation section 27 and subtracter 28 through the switch element 22.

Thereby, the mean calculation section 27 updates and stores an estimated value Ha^(cep) in the cepstrum domain of the multiplicative distortions Ha. Before the update, Ha^(cep) that has been estimated in the last utterance is provided to the adder and subtracter 28.

And, the adder and subtracter 28 generates the observation value series RNah(cep)=Ra(cep)−Ha^(cep), from which the multiplicative distortions are removed, by subtracting the estimated value Ha^(cep) from the utterance voice Ra(cep), and the collating section 29 collates the observation value series RNah(cep) with adaptive HMM 26 in units of words or subwords, wherein the adaptive HMM having the highest likelihood is outputted as a result of voice recognition.

Herein, the observation value series RNah(cep) is expressed by the above-described expression (14), and the adaptive HMM 26 is expressed by the above-described expression (13). That is, since the noise spectra of the observation value series RNah(cep) and adaptive HMM 26 become Na(lin)Hm2^(lin)/Ha^(lin), the adaptive HMM 26 becomes an acoustic model that is matched with respect to the observation value series RNa(cep).

Further, when the collating section 29 collates the observation value series RNah(cep) with adaptive HMM 26, since the noise spectrum is Na(lin)Hm2^(lin)/Ha^(lin) is the same for both of RNah(cep) and the adaptive HMM 26, voice Sm(cep)Hm(cep) in which the multiplicative distortions Hm(cep) overlap clean voice Sm(Cep) and voice Sa(cep) Ha(cep) in which the multiplicative distortions Ha(cep) overlap clean voice Sa(cep) are collated with each other. Therefore, it becomes possible to collate the same by substantially counterbalancing the influences of Na(lin) Hm2^(lin)/Ha^(lin), and further it becomes possible to collate the same by substantially counterbalancing the influences due to the multiplicative distortions Hm(cep) and Ha(cep). That is, it is possible to substantially counterbalance the influences of both the additive noise and is multiplicative distortions, wherein since clean voice Sm(cep) and clean voice Sa(cep) are collated with each other, the ratio of voice recognition can be further improved.

Thus, according to the voice recognition system of the present embodiment, the adaptive HMM 26 can be made into an acoustic model that is matched with respect to the observation value series RNah(cep) obtained in actual utterance, and at the same time, since the system is constructed sufficiently to cope with additive noise and multiplicative distortions, it is robust to the additive noise and multiplicative distortions, wherein the ratio of voice recognition can be improved. Still further, since an adequate configuration to which a Jacobian matrix is applied is achieved, the time required for voice recognition can be remarkably shortened.

In the description of the above-described first and second embodiments, operations such as addition and subtraction of voice and noise are carried out in the spectral domain and the cepstrum domain. In the description, the term "combination" means the operation of addition and subtraction. So, for example, even subtraction Ha^(cep) from Ra(cep) at the subtracter 28 in FIG. 2 is expressed as "combination of Ra(cep) and Ha^(cep)" or "combining Ra(cep) with Ha^(cep)".

As described above, the voice recognition system of the invention is constructed so that a combined voice model is generated from a voice model and a noise model, and at the same time an adaptive model including in advance information of multiplicative distortions and additive noise is generated based on the combined voice model used as a reference model, wherein, as utterance actually starts, voice recognition is carried out by collating observation value series generated from the utterance voice with the adaptive model, and the adaptive model is constructed so as to be matched to the observation value series. Therefore, it is possible to provide a voice recognition system that is robust with respect to multiplicative distortions and additive noise and is capable to perform adequate voice recognition.

Also, it is possible to provide a voice recognition system that is preferably constructed to achieve a remarkable decrease in the amount of operation or calculation by utilizing a Jacobian matrix, whereby a high-speed voice recognition system can be provided.

What is claimed is:

1. A voice recognition system, comprising:
 a voice model generated from voices being collected in advance and containing multiplicative distortions;
 a noise model generated from additive noise collected in advance;
 a first estimating section for estimating first estimated values of the multiplicative distortions contained in the voice model;
 a combined voice model generated on the basis of noise added voices which are obtained by processing to combine the voice model, the first estimated values of the multiplicative distortions, and the additive noise of the noise model;
 a calculating section for calculating a Jacobian matrix based on the additive noise of the noise model and the noise added voices;
 a second estimating section for estimating second estimated values of multiplicative distortions contained in utterance voices;
 a first operating section for obtaining noise variation by processing to combine additive noise produced in a non-utterance period, the additive noise of the noise model, and the second estimated values of the multiplicative distortions estimated by the second estimating section, the first operating section for simultaneously multiplying the noise variation by the Jacobian matrix calculated in the calculating section;
 an adaptive model generated by processing to combine the results of multiplication obtained by the first operating section and the combined voice model together; and
 a second operating section for generating an observation value series by processing to combine the utterance voice and the second estimated values of the multiplicative distortions estimated by the second estimating section;
 wherein voice recognition is carried out by collating the observation value series with the adaptive model.

2. The voice recognition system as set forth in claim 1, wherein the first operating section carries out the combining process by subtracting the additive noise of the noise model and the second estimated values of multiplicative distortion estimated by the second estimating section from the additive noise produced in the non-utterance period in a cepstrum domain.

3. A voice recognition system, comprising:
 a voice model generated from voices being collected in advance and containing multiplicative distortions;
 a noise model generated from additive noise collected in advance;
 a first estimating section for estimating a first estimated values of the multiplicative distortions contained in the voice model;
 a second estimating section for estimating second estimated values of the multiplicative distortions containing errors that vary depending on utterance voice in the voice model on the basis of the results of recognition;
 a first operating section for combining the additive noise of the noise model with the multiplicative distortions estimated by the first estimating section;
 a combined voice model generated on the basis of noise-added voices obtained by processing to combine the combined results of the first operating section and the voice model together;
 a calculating section for calculating a Jacobian matrix from the result of the combinations made by the first operating section and the noise added voice;

a third estimating section for estimating third estimated values of multiplicative distortions containing errors that vary depending on actual utterance voice in the actual utterance voice;

a second operating section for obtaining noise variation by processing to combine additive noise generated in a non-utterance period, the result of combinations made by the first operating section, the second estimated value estimated by the second estimating section, and the third estimated value of estimated by the third estimating section together, the second operating section simultaneously multiplying the noise variation by the Jacobian matrix calculated by the calculating section;

an adaptive model generated by processing to combine the result of the multiplication obtained by the second operating section, and the combined voice model; and a third operating section for generating an observation value series by processing to combine the actual utterance voice, the second estimated value estimated by the second estimating section and the third estimated value estimated by the third estimating section;

wherein voice recognition is carried out by collating the observation value series with the adaptive model.

4. The voice recognition system as set forth in claim 3, wherein the second operating section carries out the combining process by adding the second estimated value estimated by the second estimating section and subtracting the result of combination made by the first operating section and the third estimated value estimated by the third estimating section to/from the additive noise generated in the non-utterance period in a cepstrum domain.

5. A voice recognition method comprising the steps of:
generating a voice model from voices being collected in advance and containing multiplicative distortions;
generating a noise model from additive noise collected in advance;
estimating first estimated values of the multiplicative distortions contained in the voice model;
combining the voice model, the first estimated values of the multiplicative distortions, and the additive noise of the noise model to generate a combined voice model from noise added voices;
calculating a Jacobian matrix based on the additive noise of the noise model and the noise added voices;
estimating second estimated values of multiplicative distortions contained in utterance voices;
combining additive noise produced in a non-utterance period, the additive noise of the noise model, and the second estimated values to obtain noise variation,
multiplying the noise variation by the Jacobian matrix;
combining the results of multiplication obtained in the multiplying step and the combined voice model together to generate an adaptive model; and combining the utterance voice and the second estimated values to generate an observation value series;
collating the observation value series with the adaptive model to carrying out voice recognition.

6. The voice recognition method as set forth in claim 5, the combining step subtracts the additive noise of the noise model and the second estimated values of the multiplicative distortions estimated by the second estimating section from the additive noise produced in the non-utterance period in a cepstrum domain.

7. A voice recognition method comprising the steps of:
generating a voice model from voices being collected in advance and containing multiplicative distortions;
generating a noise model from additive noise collected in advance;
estimating first estimated values of the multiplicative distortions contained in the voice model;
estimating second estimated values of the multiplicative distortions containing errors that vary depending on utterance voice in the voice model on the basis of the results of recognition;
combining the additive noise of the noise model with the first estimated values of the multiplicative distortions;
combining the combined result made in the first combining step and the voice model together to generate a combined voice model from noise-added voices;
calculating a Jacobian matrix from the combined result made in the first combining step and the noise added voice;
estimating third estimated values of multiplicative distortions containing errors that vary depending on actual utterance voice in the actual utterance voice;
combining additive noise generated in a non-utterance period, the combined result made in the first combining step, the second estimated value, and the third estimated value together to obtain noise variation;
multiplying the noise variation by the Jacobian matrix;
combining the result of the multiplication made in the multiply in step with the combined voice model to generate an adaptive model; and
combining the actual utterance voice, the second estimated value and the third estimated value together to generating an observation value series;
collating the observation value series with the adaptive model to carry out voice recognition.

8. The voice recognition system as set forth in claim 3, wherein the third combination step adds the second estimated value and subtracts the first combined result and the third estimated value to/from the additive noise generated in the non-utterance period in a cepstrum domain.

* * * * *